(12) United States Patent
Losche et al.

(10) Patent No.: US 8,647,010 B2
(45) Date of Patent: Feb. 11, 2014

(54) JOINT AND/OR BEARING ASSEMBLY HAVING AN ELASTIC INTERMEDIATE LAYER

(75) Inventors: Christian Losche, Stemwede (DE); Hans-Gerd Brunneke, Georgsmarienhutte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/318,823

(22) PCT Filed: May 25, 2010

(86) PCT No.: PCT/DE2010/050031
§ 371 (c)(1),
(2), (4) Date: Nov. 4, 2011

(87) PCT Pub. No.: WO2010/139314
PCT Pub. Date: Dec. 9, 2010

(65) Prior Publication Data
US 2012/0070224 A1 Mar. 22, 2012

(30) Foreign Application Priority Data
Jun. 4, 2009 (DE) .......................... 10 2009 026 739

(51) Int. Cl.
*B60G 9/00* (2006.01)
(52) U.S. Cl.
USPC ..... 403/123; 403/133; 403/134; 280/124.156
(58) Field of Classification Search
USPC .................. 403/122, 123, 132, 133, 127, 131; 280/86.754, 86.756, 124.156
See application file for complete search history.

(56) References Cited

U.S. PATENT DOCUMENTS

| | | | |
|---|---|---|---|
| 5,251,986 A * | 10/1993 | Arena | 384/272 |
| 5,666,861 A * | 9/1997 | Fee et al. | 74/523 |
| 6,086,076 A * | 7/2000 | Prem et al. | 280/124.111 |
| 6,808,191 B1 | 10/2004 | Buhl et al. | |
| 6,959,935 B2 * | 11/2005 | Buhl et al. | 280/124.11 |
| 7,652,470 B2 * | 1/2010 | Spratte | 324/207.21 |
| 7,658,546 B2 * | 2/2010 | Clarke et al. | 384/192 |
| 7,753,612 B2 * | 7/2010 | Bouru et al. | 403/158 |
| 2002/0048485 A1* | 4/2002 | Garnier et al. | 403/135 |
| 2006/0231993 A1* | 10/2006 | Collyer et al. | 267/270 |
| 2011/0033230 A1* | 2/2011 | Brunneke et al. | 403/341 |

FOREIGN PATENT DOCUMENTS

| | | |
|---|---|---|
| DE | 659 939 C | 5/1938 |
| DE | 853 680 U1 | 11/1986 |
| DE | 36 13 123 A1 | 10/1987 |
| DE | 696 24 802 T2 | 6/2003 |
| DE | 103 58 763 A1 | 7/2005 |
| EP | 0 226 702 A1 | 7/1987 |
| EP | 0 351 689 A1 | 1/1990 |

(Continued)

*Primary Examiner* — Joshua Kennedy
(74) *Attorney, Agent, or Firm* — Davis & Bujold, PLLC; Michael J. Bujold (57) ABSTRACT

A joint assembly (1) with a joint ball (4) through which an axle body (12; 112; 212; 312) extends. The joint ball (4) is mounted in and able to rotate relative to a housing (5) that at least partially surrounds the joint ball (4) and/or one or more support rings (6) with a rubber-elastic intermediate layer (7). The joint assembly (1) is designed so that the axle body (12; 112; 212; 312) can rotate within the joint ball (4).

20 Claims, 5 Drawing Sheets

(56) References Cited

FOREIGN PATENT DOCUMENTS

| EP | 0 389 363 A1 | 9/1990 |
| EP | 0 577 536 A1 | 1/1994 |
| EP | 1 837 210 A1 | 9/2007 |
| FR | 2 691 767 A1 | 12/1993 |
| WO | 01/40001 A1 | 6/2001 |

* cited by examiner

JOINT AND/OR BEARING ASSEMBLY HAVING AN ELASTIC INTERMEDIATE LAYER

This application is a national stage completion of PCT/DE2010/050031 filed May 25, 2010 which claims priority from German Application Serial No. 10 2009 026 739.5 filed Jun. 4, 2009.

FIELD OF THE INVENTION

The invention concerns a joint assembly motor vehicle, in which a joint ball through which an axle body extends is mounted in and able to move relative to a housing that surrounds the joint ball, with a rubber-elastic intermediate layer, and a joint assembly according.

BACKGROUND OF THE INVENTION

It is known to design joint assemblies in such manner that the joint ball, mounted and able to move in a housing, cannot move by sliding relative to a joint shell possibly made of plastic that holds it, but rather, which has a rubber-elastic intermediate layer between the joint ball and the housing. This intermediate layer provides good comfort properties both in relation to damping and noise production. However, a large rotational angle of a joint axle held in the joint ball relative to the housing can be problematic, particularly in combination with a radially acting force, since the rubber-elastic layer can become detached from the inside wall of the housing or bearing shell, causing abrasion there and so affecting the properties of the joint aversely in the long term.

SUMMARY

The purpose of the present invention is to achieve an improvement in this respect.

The invention provides a joint and/or bearing assembly for a motor vehicle with which, on the one hand, the comfort given by a molecular joint having a rubber-elastic intermediate layer is retained, but on the other hand, since the axle body can rotate relative to the joint ball, it also provides the security of a slide bearing against failure or breakdown of the joint. Thus, the advantages of a molecular joint and a slide bearing are combined.

In particular, for great comfort the rubber-elastic intermediate layer can be made of a rubber material. The damping properties of a molecular joint are determined as a function of its hardness.

It is particularly advantageous for both the axle body and a boundary surface of the joint ball facing it to have an inherently stable shape over their entire contact area, so that even despite a high—even radially inward-acting—pre-stressing of the rubber-elastic intermediate layer, the fitting of the axle body remains uninfluenced and the axle body can be rotated "freely" always with the same, very small force.

Particularly due to the very small force needed for rotating, the fitting of the axle body is simplified since it is not necessary, as it is in the case of direct contact between the axle body and an elastomer, first to overcome high frictional forces by the action of a tool in order to orientate the axle body, but instead this can be inserted into the joint ball by hand and also turned easily by hand, far enough for its orientation to be appropriate for further fitting onto the vehicle. For rotating the axle body within the joint ball, it is particularly advantageous if a torque smaller than 1 Nm is required.

To ensure inherent shape stability and good tribological properties even under high loading, it is advantageous for at least the boundary surface of the joint ball facing toward the axle body to be a metallic surface. In particular the boundary surface of the joint ball facing the axle body and the boundary surface of the axle body facing the joint ball can be made of steel, especially nitrided steel or a nitrided cast iron.

It is particularly favorable for durability if the boundary surface facing toward the axle body is formed as the radially inside surface of a sleeve element with inherently stable shape, onto the outside of which the elastic material of the intermediate layer is vulcanized; adhesive bonding or some other firm attachment means are also possible.

In any case, to avoid failure it is particularly good if firm contact that prevents relative movement at any time exists between the sleeve element and the radially inside surface of the intermediate layer facing it.

In the example embodiment shown here the sleeve element forms the joint ball integrally. This is not essential, but rather, the sleeve element can form only a constituent part of the joint ball.

For precise working of the joint assembly it is also helpful for the axle body in the sleeve element to be secured against axial movement relative to the sleeve element by collars or some other securing means. This allows only torsional and rotational movements in the joint assembly, but not axial displacement of the axle body.

For good sliding mobility between the axle body and the joint ball, it is advantageous to have there a gap which is thin, for example with a thickness of up to 0.25 millimeters. A particularly thin gap of about one-tenth of a millimeter ensures play-free fitting of the axle body.

The gap can be at least partially filled with grease or some other lubricant, and in this way sliding of the components against one another is made even easier.

A friction-reducing coating on the axle body and/or the joint ball is also possible.

Furthermore, as an aid to assembly it is particularly advantageous for the axle body to be divided into at least two parts along its axial length, so enabling it to be inserted into the joint ball from two sides.

The parts of the axle body can be fixed to one another with a press fit, so that the joint assembly can be transported as a ready-assembled, prefabricated structural unit before it is fitted on the vehicle. The press fit prevents the parts of the axle body from falling apart even before the unit is fitted.

Another way to facilitate assembly by minimizing the number of different components is to make the parts of the axle body as identical components which can be held together by a separate connection piece.

Where appropriate, radially extending collars of the axle body are axially separated from the joint ball, and in this way too the mobility of the axle body relative to the joint ball is not restricted.

Here too, the separation distance can be kept small and can again be up to 0.25 millimeters.

With the invention different axle bodies, for example with different bore separations, can also be used in one and the same housing and joint ball. This provides a very high level of flexibility.

Such a joint assembly can be used in particular for utility vehicles (goods vehicles) or off-road vehicles in which it is known, besides the actual load-bearing axle suspension which supports the vertically acting dead weight of the axle, also to provide additional support that consists for example of individual, obliquely extending suspension arms or a wishbone arrangement which, at its apex, engages on a joint head carried by a pin-like holding element and is attached at the other end to longitudinal frame components of the chassis. Such a wishbone can also, for example, have a lateral guiding function for the axle body.

BRIEF DESCRIPTION OF THE DRAWINGS

Further advantages and features of the invention emerge from the example embodiments of the object of the invention illustrated in the drawing and described below.

The drawings show.

DETAILED DESCRIPTION OF THE INVENTION

Figure 1:
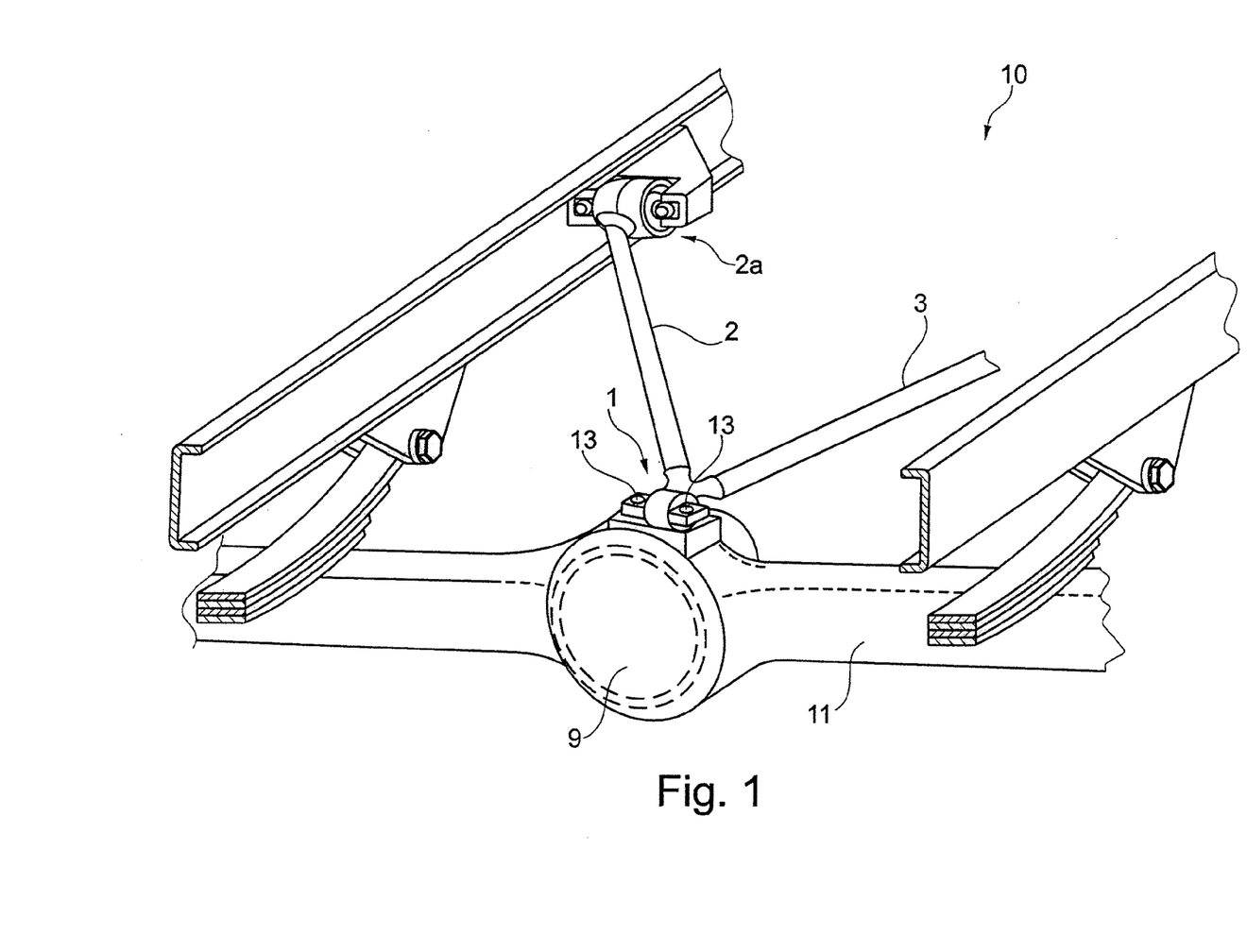
FIG. 1: A schematic perspective view of part of a utility vehicle in the area of a joint assembly for connecting an axle body—in this case a rear axle—expanded in the differential area with two suspension arms extending in a V-shape and providing further support for the axle body, such that at least at the apex of the wishbone arrangement so formed a joint assembly designed in accordance with the invention is provided.

The section of a vehicle 10 shown in FIG. 1, for example a utility vehicle or off-road vehicle, comprises two suspension arms 2, 3 which form an acute-angled wishbone arrangement which, seen from above, is in a V-shape. At the apex of the triangle so formed, these are attached, via a joint assembly 1, to a vehicle axle 11, in this case a rear axle. Relative to the transverse direction of the vehicle, the axle is expanded in the central area to accommodate a differential. Thus, the joint assembly 1 can be fitted on the upper end of the area 9 of the rear axle 11 expanded to accommodate a differential, and can therefore form a transverse guide and longitudinal guide for the vehicle axle 11. The two supporting suspension arms 2, 3 shown here can themselves, at their upper ends 2a, 3a, be connected for example to load-bearing longitudinal frame components. Here too, similar joint assemblies 1 can be used.

In this case a respective axle body 12, 112, 212, 312 of the joint or bearing assembly is secured, for example by screws or other holding means. These engage in bores 13 of the axle body 12, 112, 212, 312. Details of the arrangement 1 can also be seen in FIG. 2.

Figure 2:
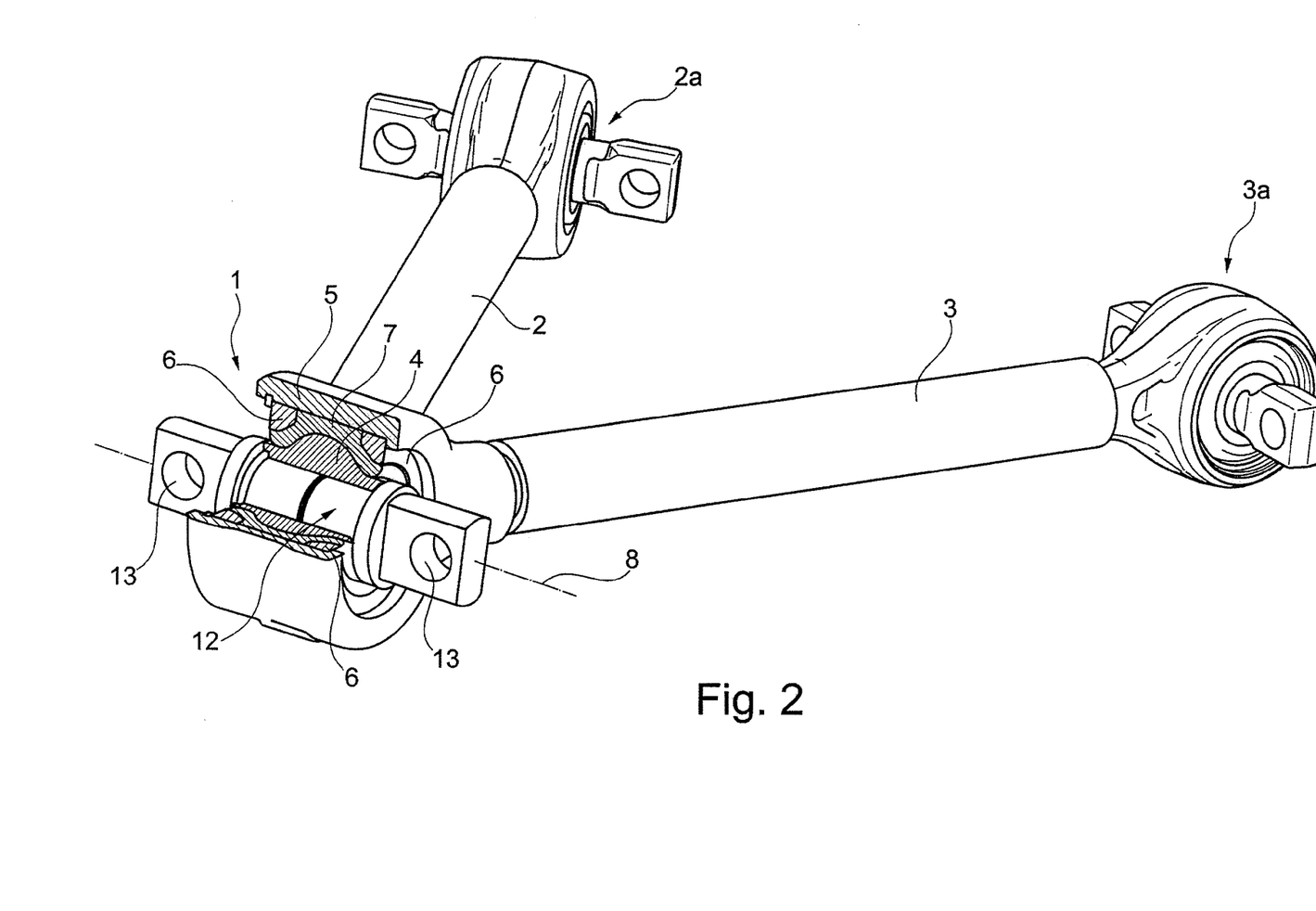
FIG. 2: A partially sectioned detail view of a possible configuration of the joint assembly at the apex of a wishbone arrangement.

In that figure it is also shown clearly that for its part, the axle body 12, 112, 212, 312 extends through a one-piece or multi-component joint ball 4; this need not actually be of spherical shape but can also, for example, have the shape of an ellipsoid, a paraboloid, or similar. In any event, relative to a housing 5 that surrounds it at least partially, or relative to one or more support ring(s) 6, it is fitted and able to move by virtue of a rubber-elastic intermediate layer 7.

In the example embodiments illustrated here a sleeve element forms the joint ball integrally, so that the two of them are given the same index 4. This is not necessarily the case, but rather, the sleeve element can also form only one constituent of a then multi-component joint ball and, for example, can be pressed into a ball-shaped body. The spherical shape can even essentially be adopted by the intermediate layer 7 and then the actual joint ball 4 itself extends more along a straight path.

As can be seen in the drawing, in all the example embodiments both the axle body 12, 112, 212, 312 and also a boundary surface of the joint ball 4 facing it across a surrounding gap 14 defined in more detail below, are in each case of inherently stable shape over their entire contact area and also throughout the life of the joint assembly 1. Accordingly, the intermediate layer 7 can be fitted under very high pre-stress, this pre-stress also acting radially inward with a large force and so preventing any relative movement between the intermediate layer 7 and the joint ball 4. Despite this large, radially inward acting force the mounting of the axle body 12, 112, 212, 312 remains uninfluenced. By virtue of its stable shape and the stable shape of the joint ball 4 surrounding it, the axle body can be rotated "freely" in the ball always by the same, very small force. The torque required for rotating the axle body does not first have to overcome considerable friction forces; rather, the axle body 12, 112, 212, 312 can always be rotated by a torque substantially smaller than 1 Nm.

As already mentioned earlier, this also facilitates assembly since it is not necessary, as in the case of direct contact of the axle body 12, 112, 212, 312 against an elastomer (such as the rubber of the intermediate layer 7) first to apply tool force in order to overcome large friction forces in order to orientate the axle body 12, 112, 212, 312; rather, it can be inserted by hand into the joint ball 4 and also rotated easily by hand, far enough for its orientation to enable further fitting to the vehicle, for example in the expanded area 9 for a differential as shown in FIG. 1.

In the example embodiment shown here, which functions very well in operation over a long period, the boundary surface of the joint ball 4 facing toward the axle body is a metallic surface, in this case a nitrided steel or nitrided cast iron surface. The same applies to the surface of the axle body 12, 112, 212, 312. Here, both components are made of steel. When the long-term loading is relatively low, a fiber-reinforced plastic can also be considered.

In the present case the boundary surface of the joint ball facing toward the axle body 12, 112, 212, 312 is in the form of a radially inner surface of an inherently stable-shaped sleeve element that guides the axle body 12, 112, 212, 312, onto the outside of which the elastic material of the intermediate layer 7 is firmly vulcanized; adhesive bonding or some other firm fixing means are also possible. In any event, detachment between the intermediate layer 7 and the joint ball 4 is excluded since by virtue of the firm contact over an area between their mutually facing boundary surfaces, no relative movement takes place between those surfaces even when the axle body 12, 112, 212, 312 is rotated or in the event of substantial bending.

Since the rubber-elastic intermediate layer 7 is vulcanized radially outside onto the support ring 6 and radially inside onto the joint ball 4, together with the axle body 12, 112, 212, 312 inserted, a prefabricated structural unit can be produced, which can be pressed under pre-stress into the housing 5 and secured against axial movement by a retaining ring (see FIG. 2).

The mobility includes at least a limited rotational mobility about the axis 8 of the axle body 12, 112, 212, 312. In conventional joint of this type such rotational mobility has to be transferred via the rubber-elastic intermediate layer. According to the present invention, the axle body 12, 112, 212, 312 is arranged to rotate within the joint ball 4 being a radial distance apart from the latter, i.e. with a gap 14 between them. Thanks to this gap 14, in this case free rotation is made possible, which even allows large deflections of 30 or more degrees; in contrast, the joint ball 4 does not have to undergo any large deflections relative to the at least one support ring 6 or the housing 5, which might result in detachment or failure of the intermediate layer 7 relative to the housing or the at least one support ring 6.

The intermediate layer 7 can consist of a rubber material with a thickness, for example, of ten to fifteen millimeters, and will thereby ensure a high level of damping comfort. A joint assembly with such an elastically damping intermediate layer 7 is often referred to as a molecular joint.

The gap 14 between the axle body 12, 112, 212, 312 on the one hand and the joint ball 4 on the other hand is of the order of tenths of a millimeter wide in the radial direction, typically with a thickness of up to 0.25 millimeters.

This gap 14 can be filled at least partially with grease or some other lubricant. With an appropriate seal, lifelong lubrication is possible. The axial edges of the gap 14 are therefore secured by seals 15 which prevent both the escape of lubricant and the entry of dirt and dust. In addition or alternatively, the joint ball 4 can be coated on its area facing the gap 14, and/or the axle body 12, 112, 212, 312 can be coated entirely or in part, with a friction-reducing coating such as PTFE, or separate sleeves with good tribological properties can be provided. In either case this results in a sliding mounting of the axle body 12, 112, 212, 312 in the joint ball 4 while at the same time, thanks to the intermediate layer 7, the very comfortable and effectively damping molecular joint is preserved so that the advantages of two different joint types are realized simultaneously. Even in the suspension arms 2, 3 are substantially bent the rubber layer 7 does not become detached, but rather, the bending takes place at least mainly between the slide bearing mounted axle body 12, 112, 212, 312 and the joint ball 4. Thus, even prior angling of the components before assembly is no longer necessary.

In the versions shown here in FIGS. 2 to 5 and 6 and 8 the axle body 12 is divided along its axial length into at least two parts 18, 19, and this considerably facilitates assembly and dismantling.

In the version shown in FIGS. 2 to 5 the division is located approximately axially in the middle, within the joint assembly 1.

To be able to pre-assemble the joint assembly 1 and ensure that the parts 18, 19 of the axle body are held together even before they have been fitted into the vehicle, the components 18, 19 can be joined to one another by a press fit 17. Even during the transport of the so pre-assembled structural unit comprising the axle body and the joint ball 4 as well as the intermediate layer 7 and the support ring(s) 6, the components 18, 19 will then remain in position with no risk of coming apart.

Figure 3:
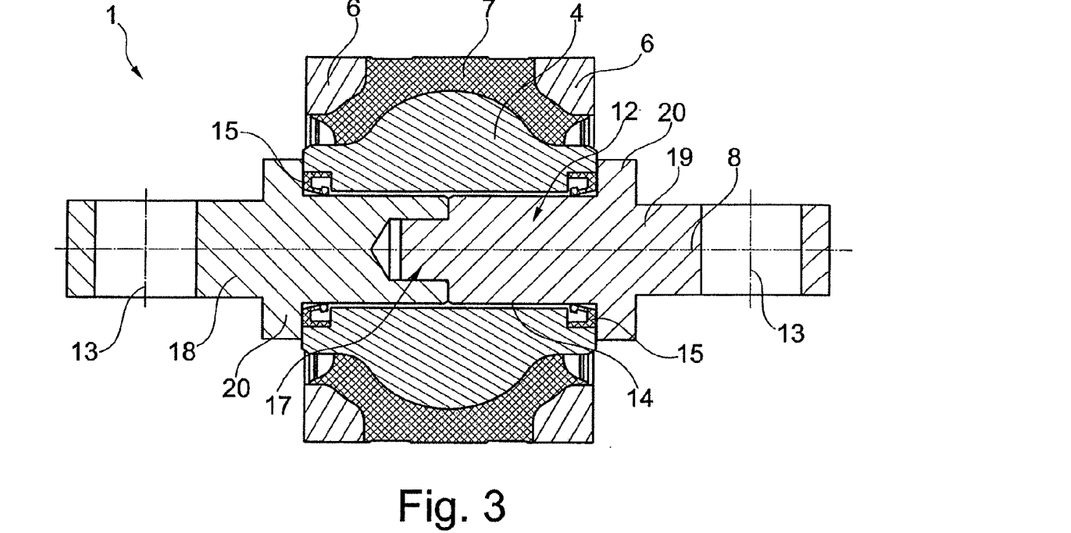
FIG. 3: A section through a joint assembly according to FIG. 2, FIG. 4: The components in FIG. 3, shown in an exploded view before their assembly.
Figure 4:
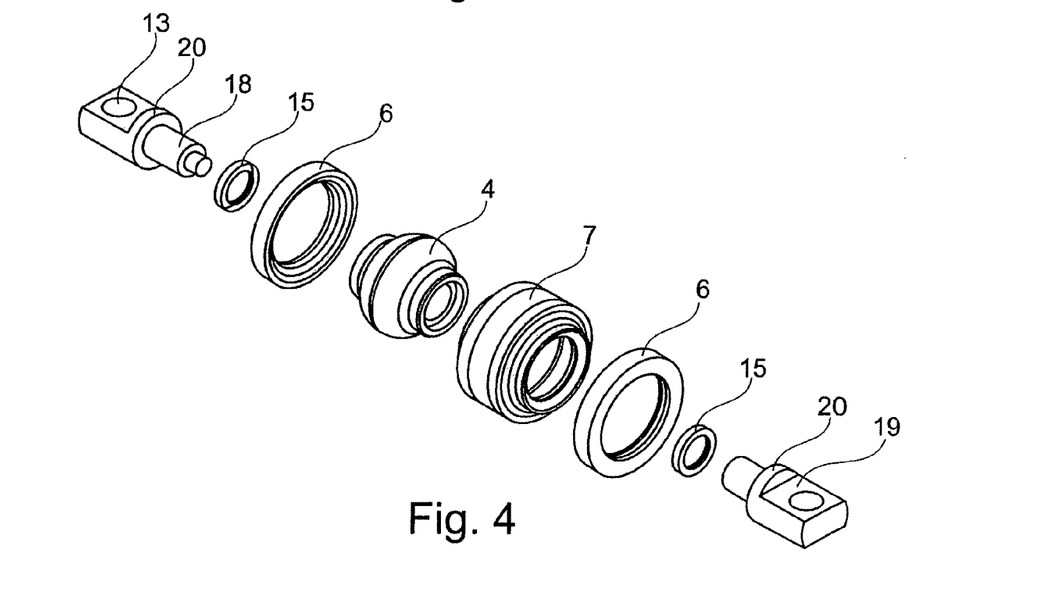
Figure 5:
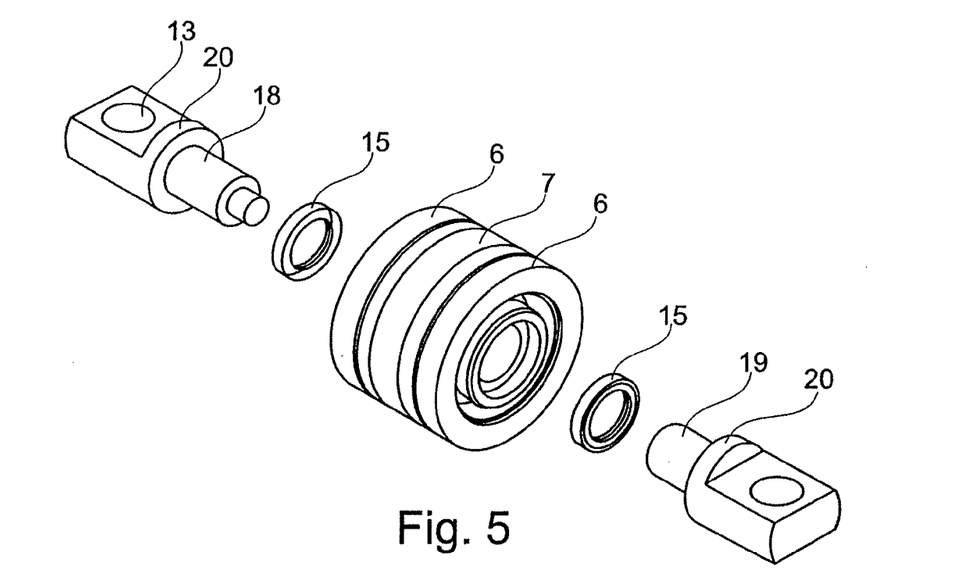
FIG. 5: A view similar to that of FIG. 4, but in a partially assembled position of the joint assembly, still before the insertion of the divided axle body.

Furthermore, FIG. 3 makes it clear that the axle body 12 also has radially extended collars 20 which are an axial distance away from the joint ball 4—and also the support ring 6 and the housing, as the case may be—so that this too does not restrict the rotary slide mounting of the axle body 12 relative to the joint ball 4. In this case too the axial distance between the collars 20 and the joint ball 4 can be up to about 0.25 millimeters. Alternatively, axial sliding disks can also be used here. In any case the axle body 12, 112, 212, 312 in the joint ball 4 is secured against any axial relative movement by collars 20, 120 or similar axial securing means. Thus, only torsional and rotational movements are possible in the joint assembly, but not any axial displacement of the axle body 12, 112, 212, 312. Circlips, retaining rings or similar means can also be used for this axial securing. Accordingly, even under the action of axial forces no relative movement takes place between the axle body 12, 112, 212, 312 and the elastomer layer 7, so wear of the rubber is prevented.

Figure 6:
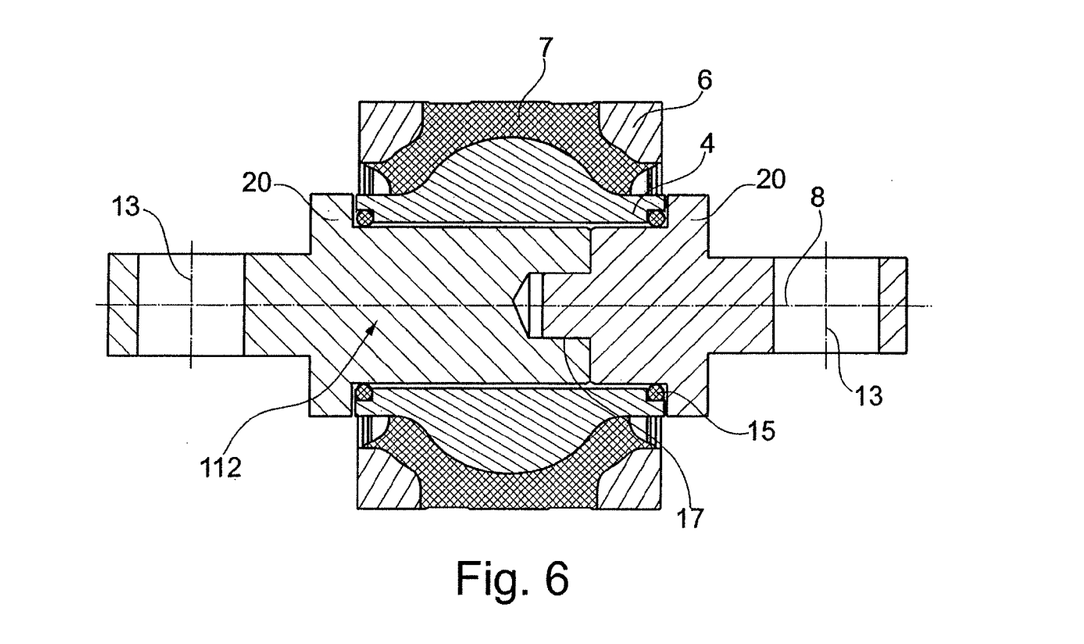
FIG. 6: A representation similar to that of FIG. 3, but with an alternative axle body divided non-centrally.

FIG. 6 shows an axle body 112 which is similar in principle, but which is divided non-centrally. This too can be used to form a joint assembly 1.

Figure 7:
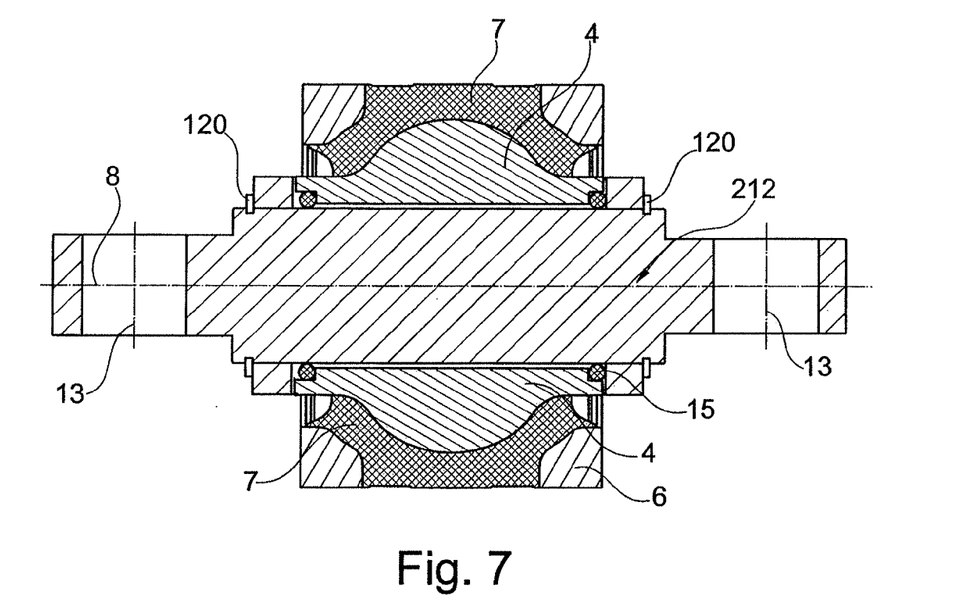
FIG. 7: A representation similar to that of FIG. 6, but with an alternative, through-going axle body secured axially by means of circlips.

The axle body 212 shown in FIG. 7 is not divided along its axial length. Nevertheless it can be pushed through the joint ball 4, since in this case no fixed collars 20 are present—as they are in the first example embodiment—but instead, the collars 120 for securing against axial displacement in this case consist of circlips that can be fitted after assembly.

Figure 8:
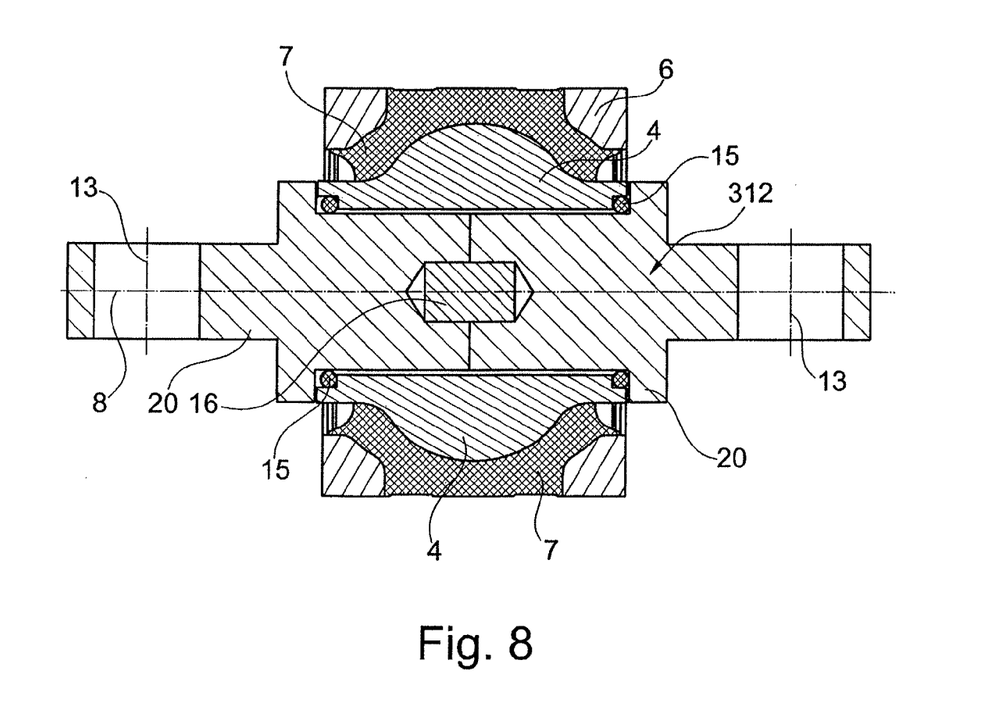
FIG. 8: A representation similar to that of FIG. 7, but with a further alternative, again centrally divided axle body whose parts are held together by an intermediate component.

FIG. 8 shows an alternative axle body 312, whose parts are made as identical components in order to simplify assembly while reducing the number of different components. In this case they can again be held together by press fitting using a separate connecting piece 16. Like the axle body 12, 112, 212, 312 as a whole, the intermediate component 16 can be a forged component.

By virtue of the invention it is also possible for different axle bodies 12, 112, 212, 312 with, for example, different lengths and different separations of the bores 13, to be used in the same housing 5 and the same joint ball 4. Thus, great production flexibility is achieved with minimal effort. It is also possible for the axle body 12, 112, 212, 312—which can for example be a forged component—and the joint ball 4—for example a casting—to be made of different materials.

Such joint assemblies can be used at various points in a vehicle 10, in particular in chassis or steering components.

LIST OF INDEXES

1 Joint assembly
2 Suspension arm
3 Suspension arm
2a Upper end of the suspension arm
3a Upper end of the suspension arm
4 Joint ball
5 Housing
6 Support ring
7 Intermediate layer
8 Axis
9 Expanded area
10 Vehicle
11 Vehicle axle
12, 112, 212, 312 Axle body
13 Bores of the axle body
14 Gap
15 Gap seals
16 Intermediate piece
17 Press fit
18 First part of the axle body
19 Second part of the axle body
20 Extended collar
120 Collar

The invention claimed is:

1. A joint assembly (1) for chassis or steering components of a motor vehicle (10), the joint assembly comprising a joint ball (4), through which an axle body (12; 112; 212; 312) extends, that is mounted in and movable relative to a housing (5) that at least partially surrounds the joint ball (4), at least one support ring (6) and a rubber-elastic intermediate layer (7),     the joint ball (4) comprises a sleeve element that forms a radially inner boundary surface of the joint ball that faces the axle body (12; 112; 212; 312), the sleeve element (4) is rigid and has an inherently stable shape, the axle body (12; 112; 212; 312) is arranged and able to rotate within the sleeve element (4),     the axle body (12; 112; 212; 312) being secured in the sleeve element by axial securing means (20; 120) to prevent axial movement of the axle body (12; 112; 212; 312) relative to the sleeve element (4), and     the sleeve element is spaced, along an entire axial length thereof, from the axle body by a gap, and seals are located at opposite axial ends of the sleeve element radially between the joint ball and the axle body, such that the axle body (12; 112; 212; 312) can be rotated freely in the joint ball (4) by a same minimal force.

2. The joint assembly (1) according to claim 1, wherein the axle body (12; 112; 212; 312) and the sleeve element of the joint ball (4) each have inherently stable shape and the sleeve element is integrally secured to the joint ball.

3. The joint assembly (1) according to claim 2, wherein at least the sleeve element of the joint ball (4), facing toward the axle body (12; 112; 212; 312), is a metallic surface.

4. The joint assembly (1) according to claim 3, wherein the sleeve element of the joint ball (4), facing toward the axle body (12; 112; 212; 312), and the boundary surface of the axle body (12; 112; 212; 312), facing toward the joint ball (4), are made of a nitrided steel.

5. The joint assembly (1) according to claim 1, wherein the elastic material of the intermediate layer (7) is vulcanized onto an outer surface side of the joint ball (4).

6. The joint assembly (1) according to claim 1, wherein a torque of less than 1 Nm is required to rotate the axle body (12; 112; 212; 312) in the sleeve element (4).

7. The motor vehicle (10) according to claim 1, wherein the axle body (12; 112; 212; 312) is divided, over its axial length, into at least two parts (18; 19).

8. The motor vehicle (10) according to claim 7, wherein the at least two parts of the axle body (12; 112; 212; 312) are connected with one another by a press fit (17).

9. The motor vehicle (10) according to claim 7, wherein the at least two parts of the axle body (312) are held together by a separate connecting piece (16).

10. The joint assembly (1) according to claim 1, wherein the joint ball (4) with the inserted axle body (12; 112; 212; 312) and the intermediate layer (7) are pre-assembled to form a structural unit that can be fitted together.

11. The joint assembly (1) according to claim 1, wherein one of a single joint ball of unitary construction and a single rubber-elastic intermediate layer (7) of unitary construction envelope an entire portion of the axial body that extends through the joint ball.

12. The joint assembly (1) according to claim 1, wherein the gap has a thickness of between 0.10 millimeters and 0.25 millimeters.

13. A motor vehicle (10) in combination with a joint assembly (1) in chassis or steering components, in which a joint ball (4), through which an axle body (12; 112; 212; 312) extends, is mounted in and movable relative to a housing (5) that at least partially surrounds the joint ball (4), at least one support ring (6) and a rubber-elastic intermediate layer (7),     the joint ball (4) comprises a sleeve element that forms a radially inner boundary surface of the joint ball that faces the axle body (12; 112; 212; 312) the sleeve element (4) is rigid and has an inherently stable shape such that the axle body (12; 112; 212; 312) is arranged and able to rotate within the sleeve element (4),     the axle body (12; 112; 212; 312) being secured in the sleeve element by axial securing means (20; 120) to prevent axial movement of the axle body (12; 112; 212; 312) relative to the sleeve element (4), and     the axle body (12; 112; 212; 312) is spaced a radial distance away from an entire axial length of the sleeve element of the joint ball (4), and seals are located at opposite axial ends of the sleeve element radially between the joint ball and the axle body such that the axle body (12; 112; 212; 312) can be rotated freely in the joint ball (4) by a same minimal force.

14. The motor vehicle (10) according to claim 13, wherein the axle body (12; 112; 212; 312) is arranged at a radial distance away from the joint ball (4), and a gap (14), with a thickness of up to 0.25 millimeters, is provided between the axle body (12; 112; 212; 312) and the entire axial length of the sleeve element of the joint ball (4).

15. The motor vehicle (10) according to claims 13, wherein an area of the joint ball (4), facing toward the gap (14), is at least partially provided with a friction-reducing coating.

16. The motor vehicle (10) according to claim 13, wherein the joint assembly (1) is located in an area of an apex of a wishbone arrangement (2, 3).

17. A chassis or steering component for a motor vehicle, with a joint assembly (1) comprising a joint ball (4), through which an axle body (12; 112; 212; 312) extends, being movable relative to a housing (5) that at least partially surrounds the joint ball (4), at least one support ring (6) and a rubber-elastic intermediate layer (7),     the joint ball (4) comprises a sleeve element that forms a radially inner boundary surface of the joint ball that faces the axle body (12; 112; 212; 312), the sleeve element (4) is rigid and has an inherently stable shape such that the axle body (12; 112; 212; 312) is arranged and able to rotate within the sleeve element (4),     the axle body (12; 112; 212; 312) comprises axial securing means (20; 120) that extend radially therefrom and abut axially opposite ends of the joint ball to prevent axial movement of the axle body (12; 112; 212; 312) relative to the sleeve element (4), and     the sleeve element is spaced, along an entire axial length thereof, from the axle body by a gap, and seals are located at opposite axial ends of the sleeve element radially between the joint ball and the axle body such that the axle body (12;112;212;312) can be rotated freely in the joint ball (40 by a same minimal force.

18. The chassis or steering component with the joint assembly (1) according to claim 17, wherein a seal is located, at opposite axial ends of the sleeve element, axially between the sleeve element and the axial securing means of the axle body to enclose and seal the gap between the sleeve element and the axle body.

19. The chassis or steering component with the joint assembly (1) according to claim 18, wherein the seals are radially located between the axially opposite ends of the joint ball and the axle body.

20. A joint assembly (1) for chassis or steering components of a motor vehicle (10), the joint assembly comprising a joint ball (4), through which an axle body (12; 112; 212; 312) extends, that is mounted in and movable relative to a housing (5) that at least partially surrounds the joint ball (4), at least one support ring (6) and a rubber-elastic intermediate layer (7), the joint ball (4) comprises a sleeve element that forms a radially inner boundary surface of the joint ball that faces the axle body (12; 112; 212; 312), the sleeve element (4) is rigid and has an inherently stable shape, the axle body (12; 112; 212; 312) is arranged and able to rotate within the sleeve element (4), the axle body (12; 112; 212; 312) being secured in the sleeve element by axial securing means (20; 120) to prevent axial movement of the axle body (12; 112; 212; 312) relative to the sleeve element (4), and the sleeve element is spaced, along an entire axial length thereof, from the axle body by a gap, and seals are located at opposite axial ends of the sleeve element radially between the joint ball and the axle body, wherein the axial body has a substantially constant cylindrical outer shape through an entire portion of the axial body that extends through the joint ball, the joint ball is spherical in shape, and the gap is of sufficient spacing to allow the introduction of a lubricant between the sleeve element and the axle body.

* * * * *